US009626216B2

(12) United States Patent
Cameron et al.

(10) Patent No.: US 9,626,216 B2
(45) Date of Patent: Apr. 18, 2017

(54) GRAPHICS PROCESSING UNIT SHARING BETWEEN MANY APPLICATIONS

(75) Inventors: Christopher Michael Cameron, San Francisco, CA (US); Timothy James Murray, San Francisco, CA (US); Joel Adam Scherpelz, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 696 days.

(21) Appl. No.: 13/467,781

(22) Filed: May 9, 2012
(Under 37 CFR 1.47)

(65) Prior Publication Data
US 2013/0300655 A1 Nov. 14, 2013

(51) Int. Cl.
*G06F 9/46* (2006.01)
*G06F 9/50* (2006.01)

(52) U.S. Cl.
CPC ............ *G06F 9/461* (2013.01); *G06F 9/5016* (2013.01)

(58) Field of Classification Search
None
See application file for complete search history.

(56) References Cited

U.S. PATENT DOCUMENTS

| 7,697,007 | B1 * | 4/2010 | Duluk, Jr. .................. 345/522 |
| 7,746,350 | B1 * | 6/2010 | Danilak .................... G06F 9/24 345/505 |
| 8,082,426 | B2 | 12/2011 | Paltashev et al. |
| 8,200,796 | B1 * | 6/2012 | Margulis ............... G06F 3/1431 709/217 |
| 2009/0019448 | A1 * | 1/2009 | Bouge et al. ................. 718/104 |
| 2011/0161978 | A1 * | 6/2011 | Jang et al. ................... 718/104 |
| 2012/0291040 | A1 * | 11/2012 | Breternitz et al. ............ 718/104 |

FOREIGN PATENT DOCUMENTS

| TW | 201120754 A1 | 6/2011 |
| TW | 201140451 A1 | 11/2011 |

* cited by examiner

*Primary Examiner* — Tammy Lee
(74) *Attorney, Agent, or Firm* — Artegis Law Group, LLP

(57) ABSTRACT

A technique for executing a plurality of applications on a GPU. The technique involves establishing a first connection to a first application and a second connection to a second application, establishing a universal processing context that is shared by the first application and the second application, transmitting a first workload pointer to a first queue allocated to the first application, the first workload pointer pointing to a first workload generated by the first application, transmitting a second workload pointer to a second queue allocated to the second application, the second workload pointer pointing to a second workload generated by the second application, transmitting the first workload pointer to a first GPU queue in the GPU, and transmitting the second workload pointer to a second GPU queue in the GPU, wherein the GPU is configured to execute the first workload and the second workload in accordance with the universal processing context.

17 Claims, 10 Drawing Sheets

GRAPHICS PROCESSING UNIT SHARING BETWEEN MANY APPLICATIONS

BACKGROUND OF THE INVENTION

Field of the Invention

The present invention generally relates to compute applications, and, more specifically, to simultaneously executing plural compute applications on a graphics processing unit (GPU) having multiple cores.

Description of the Related Art

Current methods for sharing hardware resources available on a GPU between plural compute applications require the compute applications to communicate with a central resource manager. In particular, the central resource manager receives workloads from the compute applications and transmits the workloads to the GPU for execution. In turn, the GPU controls synchronization between the compute applications and permits only threads of a single compute application to be executed by the GPU at a time. These threads may become unresponsive during synchronization operations, which makes it difficult for software developers to maintain overall system responsiveness and proper load balancing. Moreover, the GPU is required to execute a context switch for every transition into executing threads of a different compute application, which results in GPU idle time. This problem is exacerbated by the typically large sets of state that are associated with compute applications and must be stored (and subsequently reloaded) when a context switch occurs.

Accordingly, what is needed in the art is a more effective technique for executing plural compute applications on a GPU.

SUMMARY OF THE INVENTION

One embodiment of the present inventions sets forth a computer-implemented method for executing a plurality of applications on a graphics processing unit (GPU). The method comprises the steps of establishing a first connection to a first application and a second connection to a second application, establishing a universal processing context that is shared by the first application and the second application, transmitting a first workload pointer to a first queue allocated to the first application, wherein the first workload pointer points to a first workload generated by the first application, transmitting a second workload pointer to a second queue allocated to the second application, wherein the second workload pointer points to a second workload generated by the second application, transmitting the first workload pointer to a first GPU queue in the GPU, and transmitting the second workload pointer to a second GPU queue in the GPU, wherein the GPU is configured to execute the first workload and the second workload in accordance with the universal processing context.

One advantage of the disclosed embodiments of the present invention is that they enable software developers to choose how plural compute applications simultaneously share a GPU. In particular, embodiments of the present invention enable the plurality of compute applications, and the threads associated therewith, to be truly simultaneously executed by the GPU. Each of the compute applications has access to a universal processing context that is managed by a server within a GPU driver with which the compute applications are configured to communicate. As a result, the number of context switches—which are implemented by conventional GPUs to create the illusion of "simultaneously" executing multiple applications—may be reduced, which lowers overhead and increases overall performance of the GPU.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
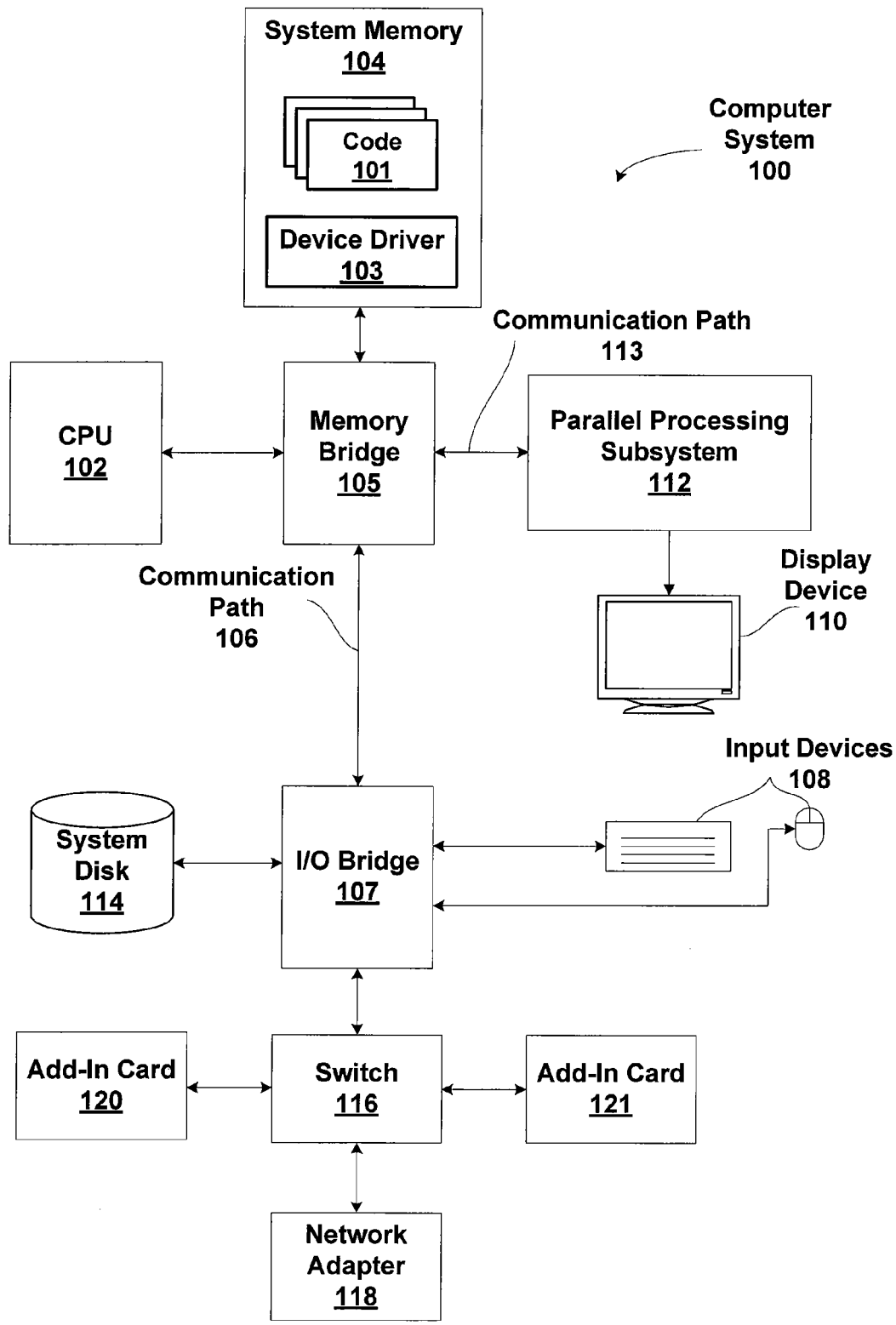
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. System memory 104 includes an execution image of an operating system (not illustrated), a device driver 103, and code 101 that is configured for execution by parallel processing subsystem 112. In one embodiment, code 101 represents CUDA™ code that incorporates programming instructions intended to execute on parallel processing subsystem 112. In the context of the present description, the term "code" refers to any computer code, instructions, and/or functions that may be executed using a processor. For example, in various embodiments, the code may include C code, C++ code, etc. In one embodiment, the code may include a language extension of a computer language (e.g., an extension of C, C++, etc.).

The operating system provides the detailed instructions for managing and coordinating the operation of computer system 100. Device driver 103 provides detailed instructions for managing and coordinating operation of the parallel processing subsystem 112, and, in particular, parallel processing units included therein. Furthermore, device driver 103 may provide compilation facilities for generating machine code specifically optimized for the parallel processing units included in parallel processing subsystem 112. Device driver 103 may be provided in conjunction with the CUDA™ framework provided by NVIDIA Corporation.

Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. Parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
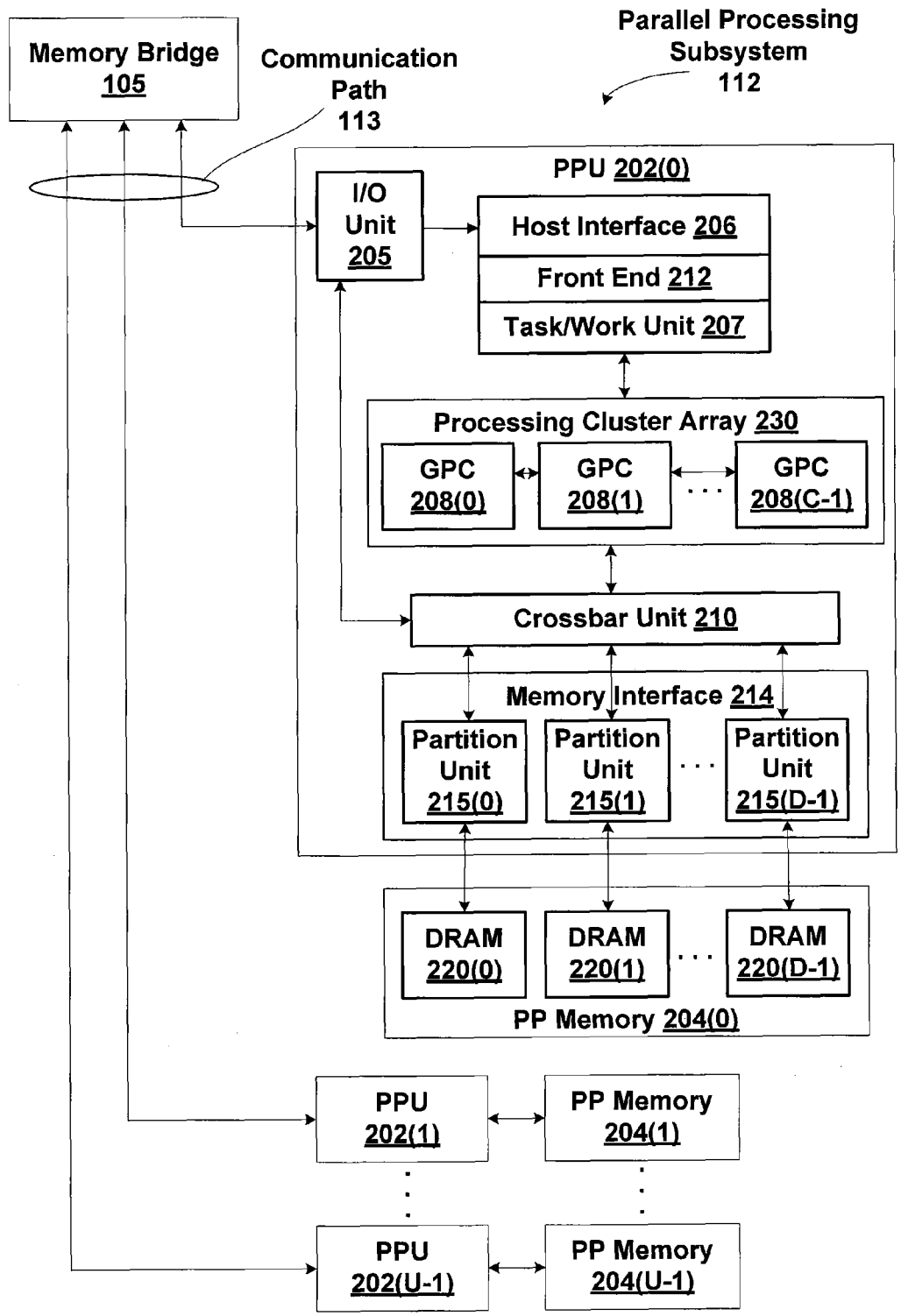
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D 1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and non-linear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
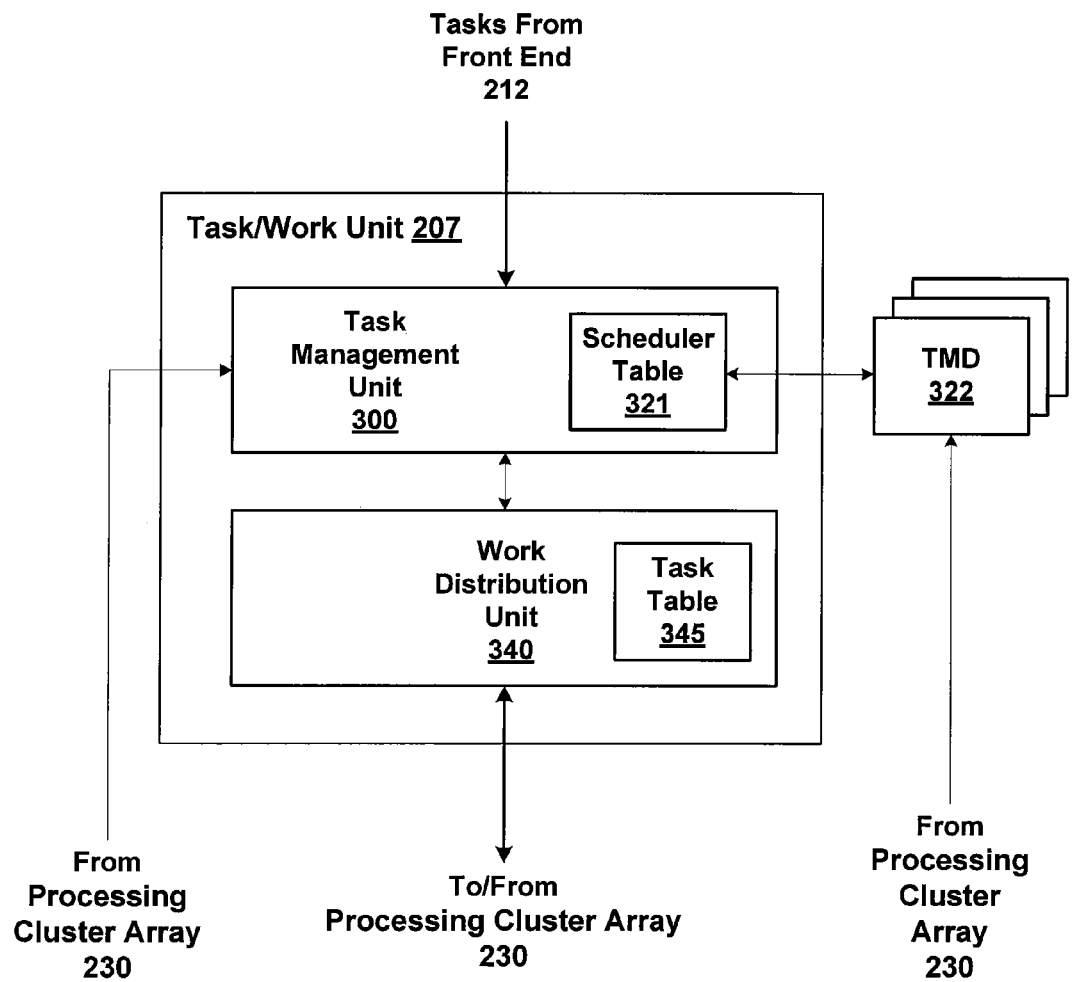
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
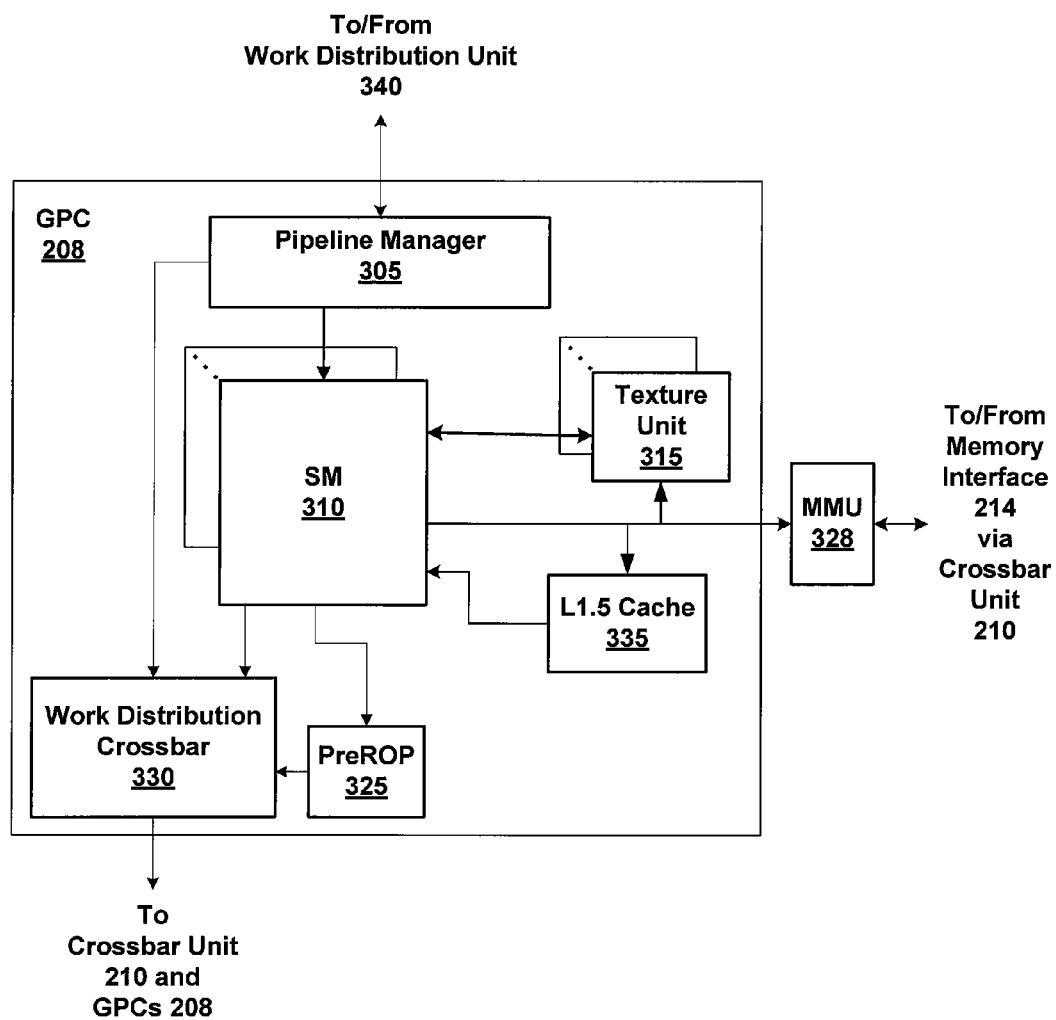
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
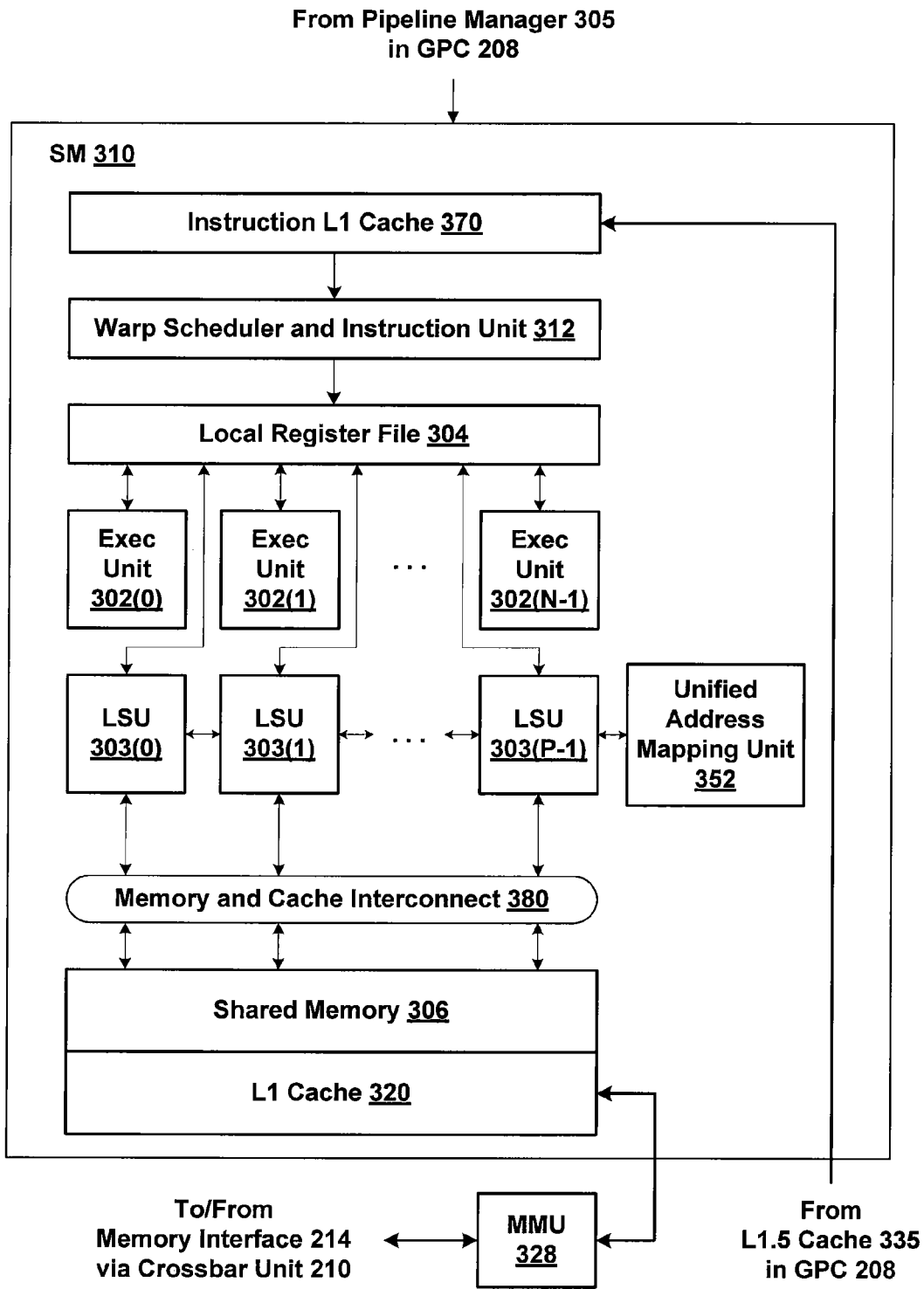
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread. ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

GPGPU Sharing Between Many Applications

Figure 4:
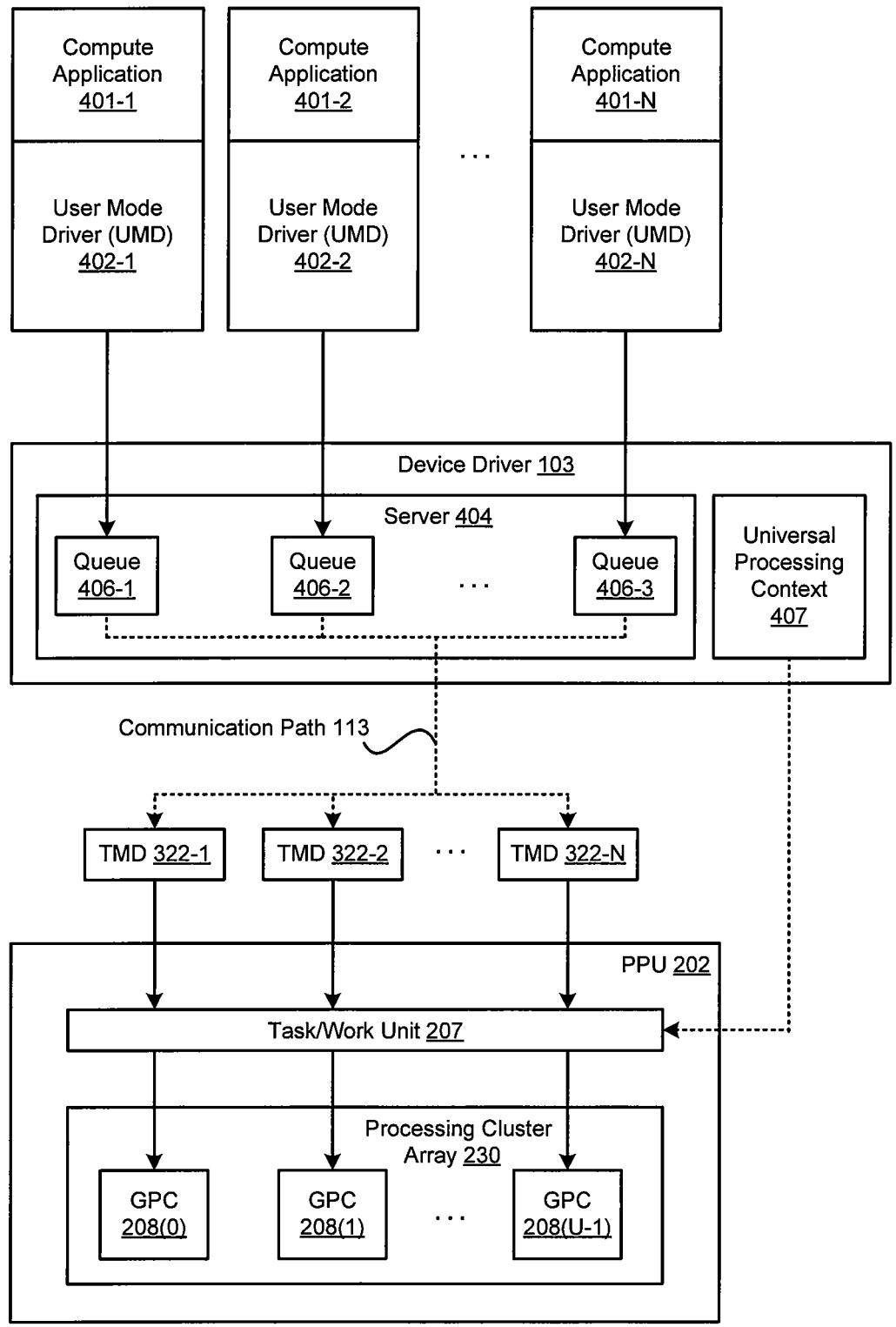
FIG. 4 illustrates a block diagram that details the communication path and interaction between a plurality of compute applications, a device driver and a parallel processing subsystem, according to one embodiment of the present invention.

FIG. 4 illustrates a block diagram that details the communication path and interaction between a plurality of compute applications 401, the device driver 103 and a PPU 202, according to one embodiment of the present invention. In FIG. 4, each compute application 401 represents different compiled user code 101 that is under the control of CPU 102 and interacting with device driver 103, which directs work generated by the compute applications 401 to GPCs 208 within the PPU 202 for processing. In particular, and as described herein, SMs 310 within GPCs 208 execute the generated workloads, which are delivered via TMDs 322. As shown, each compute application 401 is associated with a user mode driver (UMD) 402, which, in some cases, includes a subset of the functionality provided by device driver 103, and enables the UMD 402 to communicate with device driver 103. As will be described in further detail below in conjunction with FIG. 6, each compute application 401, when initialized by the CPU 102, communicates with the associated UMD 402 via application programming interface (API) calls that are included in the code 101 from which the compute application 401 is derived.

Also shown in FIG. 4 is a server 404, which executes under the control of device driver 103 and interacts with the plurality of UMDs 402. In particular, the server 404, upon receiving an initial request from a UMD 402 to execute work within PPU 202, creates a particular queue 406 onto which that UMD 402 is able to push the work to be executed, the details of which are described below in conjunction with FIG. 7. The server 404 also manages a universal processing context 407 that is shared between the compute applications 401, which provides a pool of memory to the compute applications 401. The compute applications 401 can allocate varying portions of the pool of memory according to the requirements of the work that they produce for processing. The device driver 103 is configured to pop work from each of the queues 406, e.g., using a round-robin technique, and to push the work to TMDs 322 that have the capacity to receive new work, the details of which are described below in conjunction with FIG. 8. The techniques described herein provide various performance gains over conventional approaches, an example of which is described below in conjunction with FIGS. 5A-5B.

Figure 5A:
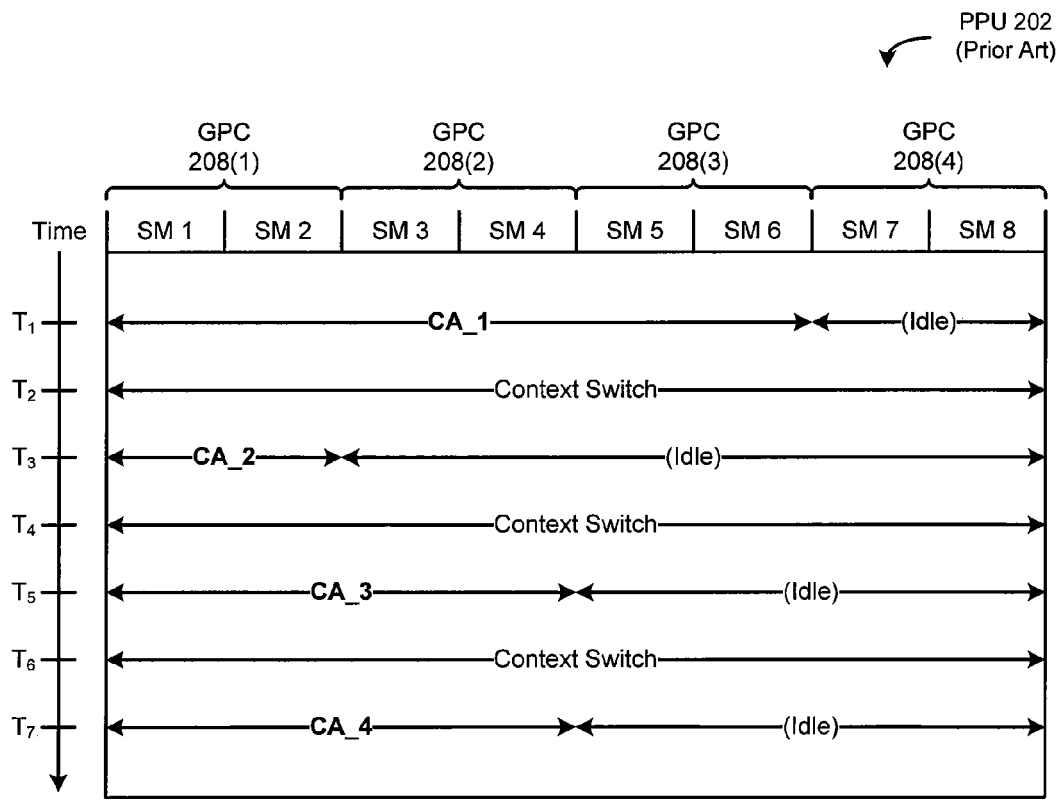
FIGS. 5A-5B illustrates a performance comparison between a conventional device driver and a device driver configured according to embodiments of the present invention.

FIG. 5A illustrates an exemplary PPU 202 that is under the control of a device driver that uses conventional approaches to distribute work from plural compute applications 401 to a PPU 202. As previously described herein, conventional device drivers enable threads of only a single compute application to be executed by SMs 310 of the GPCs 208 included in the PPU 202. As a result, "simultaneous" execution of the compute applications 401 requires the PPU 202 to frequently execute context switches, which are high-overhead operations that introduce latency, e.g., times T2, T4 and T6. Moreover, when a compute application does not generate enough work to utilize each of the SMs 310 included in the GPCs 208, those unutilized SMs 310 sit idle, even though another compute application might have already issued work to be executed.

As shown in FIG. 5A, multiple compute applications issue work to the PPU 202 under the control of a conventional device driver. At time T1, work generated by compute application CA_1 utilizes SMs 310(1-6) of the GPCs 208 (1-3), but leaves the SMs 310(7-8) of the GPC 208(4) idle since there is no work for the SMs 310(7-8) of the GPC 208(4) to execute. This applies even when work has already been generated by compute application CA_2, which, in the example illustrated in FIG. 5A, requires two SMs 310 for execution (e.g., the idle SMs 310(7-8) of the GPC 208(4)). Instead, to process the work generated by the compute application CA_2, the PPU 202 must issue a context switch at time T2, which, as described above, is a high-overhead operation that requires the processing context for compute application CA_1 to be flushed out and stored into memory, followed by the processing context for compute application CA_2 to be loaded into memory.

At time T3, SMs 310(1-2) process the work generated by the compute application CA_2, and the SMs 310(3-8) are left idle, even though work for compute applications CA_3 and CA_4 may have already been issued and is pending execution. The times T4-T7 illustrate exemplary operations carried out by the parallel processing subsystem 112 in order to execute the remaining work generated by compute applications CA_3 and CA_4 after the work generated by CA_2 is executed. As shown, these operations include additional context switches and idle SMs 310 within GPCs 208, which creates inefficiencies.

Figure 5B:
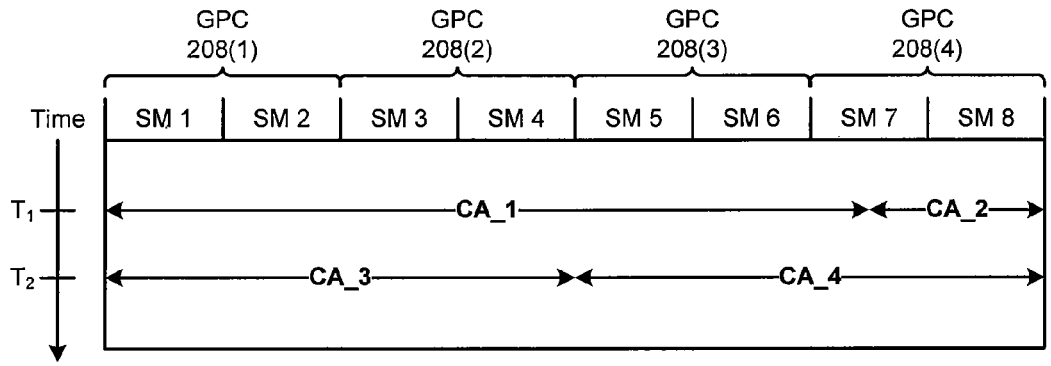

FIG. 5B illustrates a comparative example scenario where multiple compute applications issue work to a PPU 202 under the control of device driver 103, which is configured to implement embodiments of the present invention. In particular, embodiments of the present invention enable threads of multiple compute applications to be truly simultaneously executed by SMs 310 within GPCs 208 included in the PPU 202. For example, at time T1 in FIG. 5B, threads associated with compute application CA_1 are executed by SMs 310 (1-7), while threads associated with compute application CA_2 are executed by SMs 310 (7-8). The overlap between compute application CA_1 and CA_2 over the SM 310(7) illustrates functionality provided by embodiments of the invention, which involves executing work generated by two different compute applications within a single SM 310 since each SM 310 may include a plurality of execution units 302, as described above in conjunction with FIG. 3B. Since, under the configuration of embodiments of the invention, each compute application shares the same universal processing context 407, PPU 202 is able to transition to processing compute applications CA_3 and CA_4, which is illustrated by time T2, where threads associated with compute application CA_3 are executed by SMs 310 (1-4), and threads associated with compute application CA_4 are executed by SMs 310 (5-8). Thus, the overhead of context switches required by conventional techniques is reduced, and, further, every GPC 208 included in the PPU 202 can, under some cases, be fully utilized when the compute applications 401 generate an amount of work that meets or exceeds the capabilities of the PPU 202.

Figure 6:
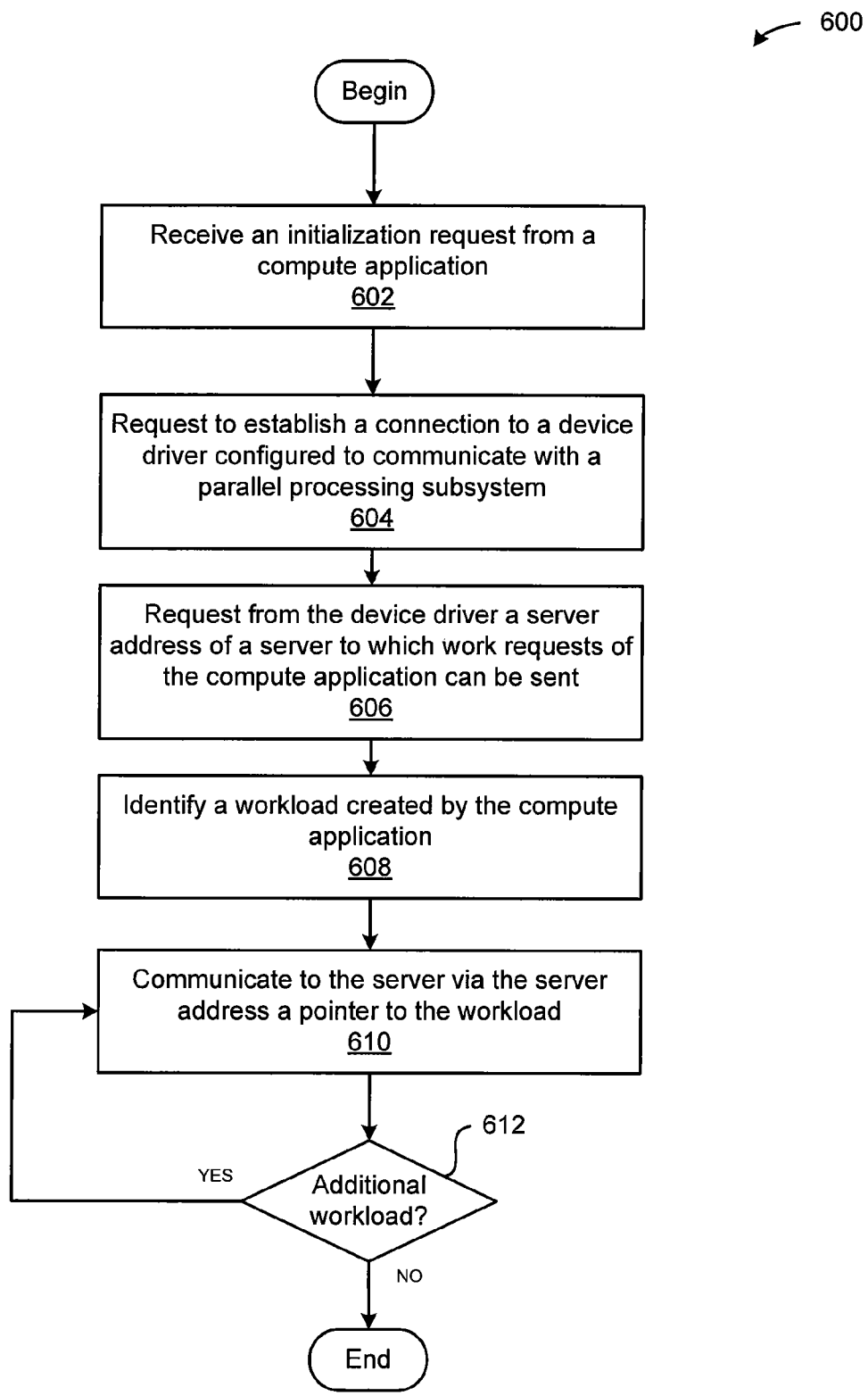
FIG. 6 illustrates a method for establishing communication between a user mode driver and a device driver, according to one embodiment of the present invention.

FIG. 6 illustrates a method for establishing communication between a UMD 402 and the device driver 103, according to one embodiment of the present invention. Although the method steps are described in conjunction with the systems of FIGS. 1, 2, 3A, 3B, 3C, and 4, persons of ordinary skill in the art will understand that any system configured to perform the method steps, in any order, is within the scope of the invention.

As shown, the method 600 begins at step 602, where a UMD 402 receives an initialization request from a compute application 401 that is executing under the control of CPU 102. In one example, compute application 401 is a CUDA application that references functionality included in both the UMD 402 associated therewith and the device driver 103, where the functionality of the UMD 402 is executed by the CPU 102 and the functionality of the device driver 103 is carried out by the parallel processing subsystem 112.

Figure 7:
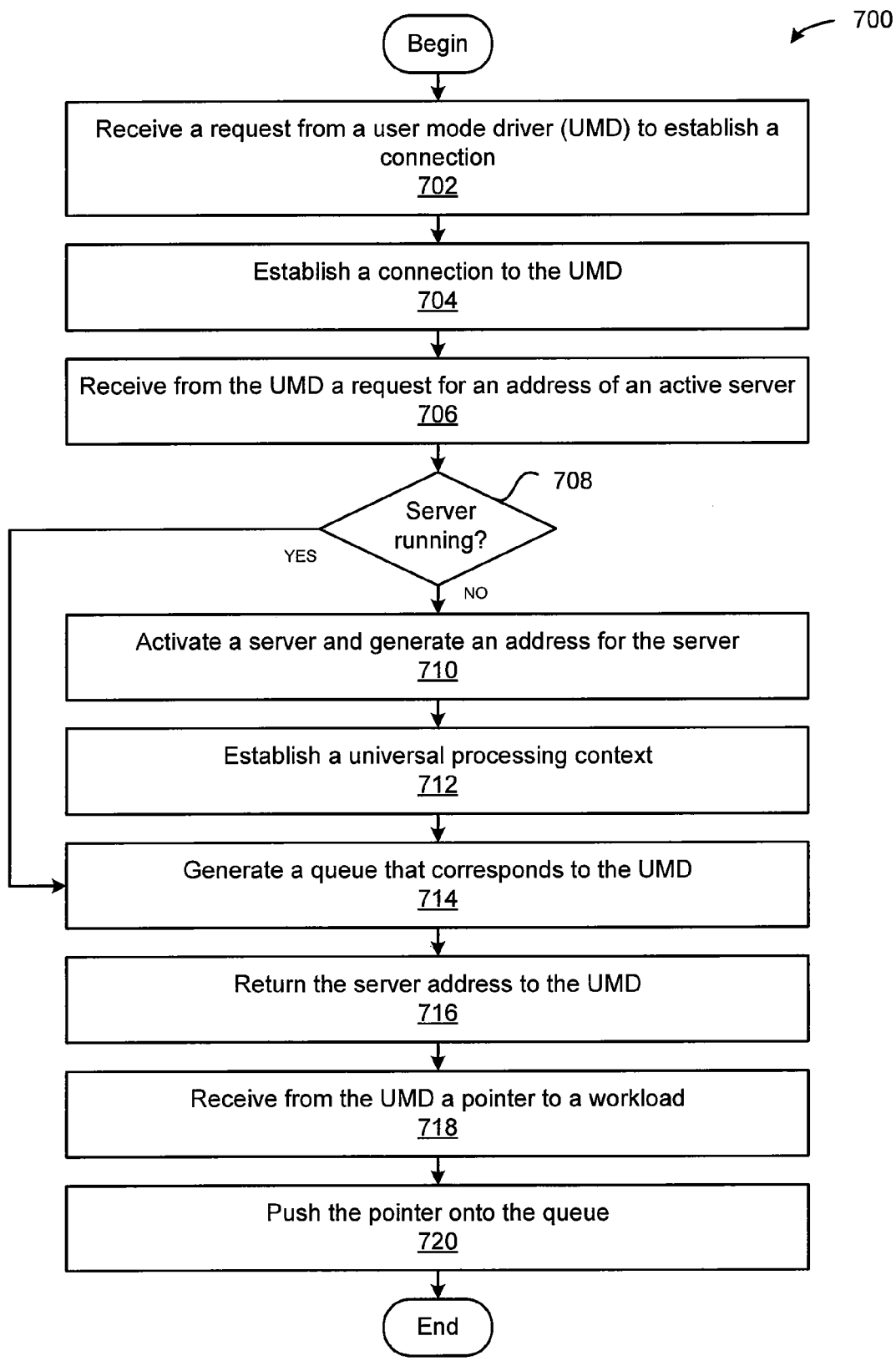
FIG. 7 illustrates a method for establishing a server within a device driver that is configured to receive work requests from plural user mode drivers, according to one embodiment of the present invention.

At step 604, the UMD 402 requests to establish a connection to the device driver 103, which is known to the UMD 402, e.g., through static parameters. At step 606, the UMD 402 requests from the device driver 103 a server address, e.g., of the server 404 executed by device driver 103, to which work requests generated by the compute application 401 can be queued for processing by a PPU 202. At step 608, the UMD 402 identifies a workload created by the compute application 401. At step 610, the UMD 402 communicates to the server 404 a pointer to the workload, which, as described in detail below in conjunction with FIG. 7, is subsequently pushed into a queue 406 of the server 404 that corresponds to the UMD 402. At step 612, the UMD 402 enters into a listening mode for additional workloads generated by the compute application 401. A pointer to each additional workload that is generated is then communicated to the queue 406 according to step 610. When the compute application 401 terminates, the associated UMD 402 also terminates, and the method 600 ends.

FIG. 7 illustrates a method for establishing a server 404 within the device driver 103 that is configured to receive work requests from plural UMDs 402, according to one embodiment of the present invention. Although the method steps are described in conjunction with the systems of FIGS. 1, 2, 3A, 3B, 3C, 4 and 6, persons of ordinary skill in the art will understand that any system configured to perform the method steps, in any order, is within the scope of the invention.

As shown, the method 700 begins at step 702, where the device driver 103 receives a request from a UMD 402 to establish a connection. This request corresponds to step 604 described above in conjunction with FIG. 6, where the UMD 402 requests to establish a connection to the device driver 103. At step 704, the device driver 103 establishes a connection to the UMD 402.

At step 706, the device driver 103 receives from the UMD 402 a request for an address of an active server, i.e., the server 404. At step 708, the device driver 103 determines whether the server 404 is already executing, i.e., the server 404 has been initialized. If, at step 708, the device driver 103 determines that the server 404 is not executing, then the device driver 103 proceeds to step 710, where the device driver 103 activates the server 404 and generates an address for the server 404 so that the server 404 can be accessed by the UMD 402 (and any additional UMDs 402 that subsequently request a connection to the server 404).

At step 712, the device driver 103 establishes a universal processing context 407 that is shared by the UMD 402 and any subsequent UMDs 402 that issue requests for work to be processed by the parallel processing subsystem 112. As previously described herein, the universal processing context 407 enables compute applications 401 to be truly simultaneously executed by a PPU 202. At step 714, the device driver 103 generates a queue 406 that corresponds to the UMD 402 that requires the connection established at step 702. At step 716, the device driver 103 returns the server address of the server 404 to the UMD 402.

At step 718, the device driver 103 receives from the UMD 402 a pointer to a workload, e.g., a pointer that is issued by the UMD 402 at step 610 of the method 600 in FIG. 6. At step 720, the device driver 103 pushes the pointer onto the queue 406. The pointers to work requests that are pushed onto respective queues 406—along with pointers to other work requests that are pushed onto other queues 406 by the device driver 103 on behalf of other UMDs 402—are then issued out to the PPU 202 for processing, the details of which are described below in conjunction with FIG. 8.

Figure 8:
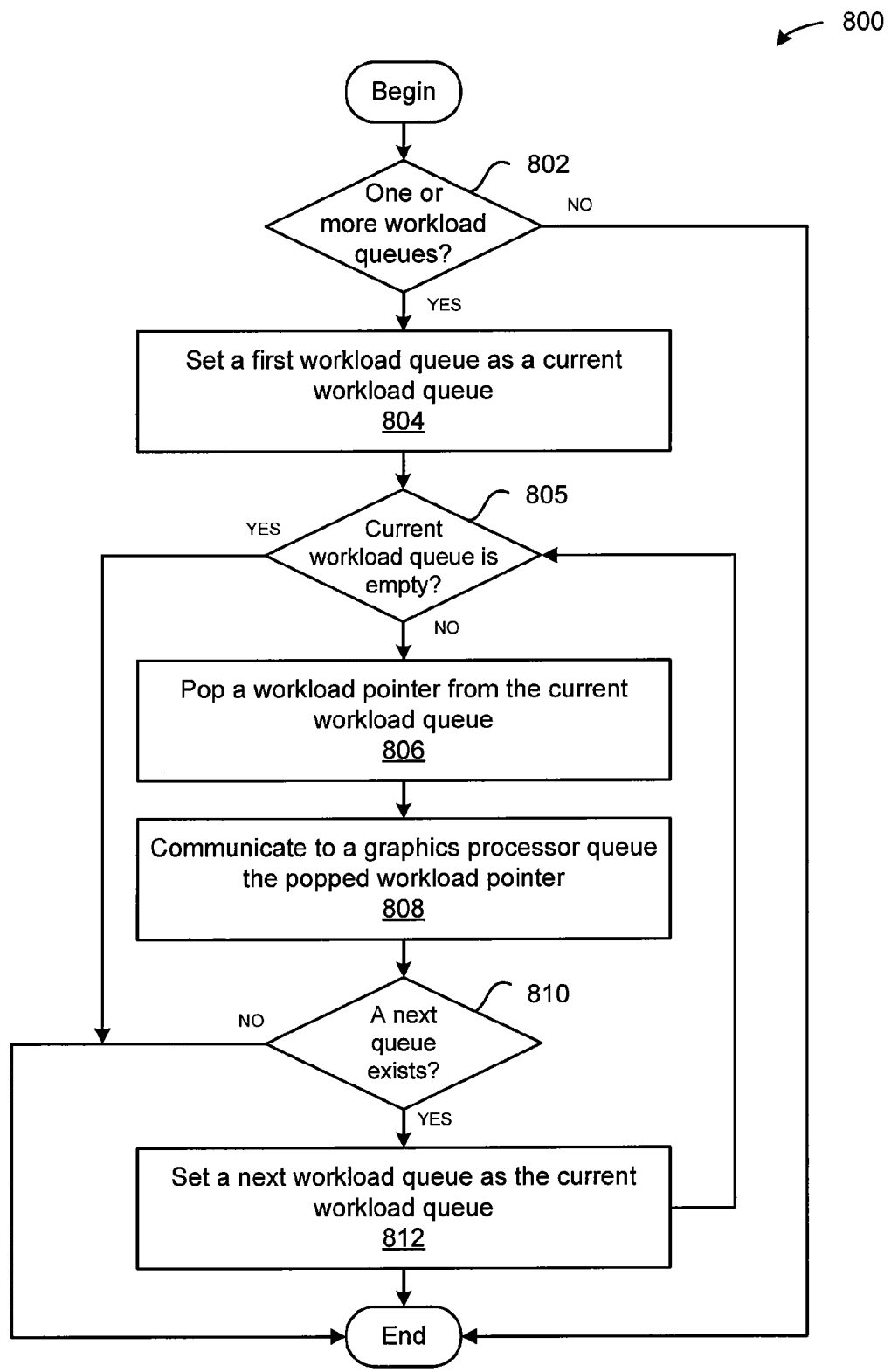
FIG. 8 illustrates a method for issuing work requests generated by plural user mode drivers to a parallel processing subsystem, according to one embodiment of the present invention.

FIG. 8 illustrates a method for issuing work requests generated by plural UMDs 402 to a PPU 202, according to one embodiment of the present invention. Although the method steps are described in conjunction with the systems of FIGS. 1, 2, 3A, 3B, 3C, 4, 6 and 7, persons of ordinary skill in the art will understand that any system configured to perform the method steps, in any order, is within the scope of the invention.

As shown, method 800 begins at step 802, where the device driver 103 determines whether there are one or more queues 406 established within the server 404.

At step 804, the device driver 103 sets a first queue 406 as a current queue 406. At step 805, the device driver 103 determines whether the current queue 406 is empty. If, at step 805, the device driver 103 determines that the current queue 406 is not empty, then the method proceeds to step 806. At step 806, the device driver 103 pops a workload pointer from the current queue 406. At step 808, the device driver 103 communicates to a TMD 322 the popped workload pointer. The workload to which the popped pointer is directed is then processed by the PPU 202 according to the techniques described above in conjunction with FIGS. 1, 2, 3A, 3B, 3C, and 4.

At step 810, the device driver 103 determines whether there are additional queues 406 within the server 404. If, at step 810, the device driver 103 determines that a next queue 406 exists within the server 404, then the method 800 proceeds to step 812, where the device driver 103 sets the next queue 406 as the current queue 406. The method steps 805-810 are then repeated for the current queue 406, such that pointers stored in different queues 406 are transmitted to TMDs 322 in an organized manner.

If, however, the device driver 103 determines that there is not a next queue 406, i.e., no compute applications 401 are executing, then the method 800 ends.

Although in method 800 the device driver 103 implements a round-robin approach to issuing work requests generated by plural UMDs 402, embodiments of the invention are no so limited and may implement other types of approaches, e.g., where the device driver 103 is multi-threaded and can issue in parallel the work requests generated by plural UMDs 402.

In sum, disclosed embodiments of the present invention enable software developers to choose how plural compute applications 401 simultaneously share a PPU 202 within parallel processing subsystem 112, and further enable the plurality of compute applications 401, and the threads associated therewith, to be truly simultaneously executed by the PPU 202. Each of the compute applications 401 has access to a universal processing context 407 that is managed by the server 404 within the device driver 103 with which the compute applications 401 are configured to communicate.

One advantage of the disclosed embodiments is that the number of context switches—which are implemented by conventional device drivers to create the illusion of "simultaneously" executing multiple applications—may be reduced, which lowers overhead and increases overall performance of a PPU 202. Moreover, embodiments of the present invention may provide an increase in the average number of actively-utilized SMs 310 within GPCs 208 included in the PPU 202 when processing work generated by the plural compute applications 401. In particular, SMs 310 within GPCs 208, which would otherwise be left idle under conventional approaches when a single compute application 401 cannot fully utilize all SMs 310, are now permitted to execute threads associated with different compute applications 401. Thus embodiments of the present invention may result in a significant increase in the overall performance of the PPU 202 in comparison to prior-art techniques.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for executing a plurality of applications on a graphics processing unit (GPU), the method comprising:
establishing a first connection to a first application and a second connection to a second application;
establishing a universal processing context that is shared by the first application and the second application;
transmitting a first workload pointer to a first queue allocated to the first application, wherein the first workload pointer points to a first workload generated by the first application;
transmitting a second workload pointer to a second queue allocated to the second application, wherein the second workload pointer points to a second workload generated by the second application;
transmitting the first workload pointer to a first GPU queue in the GPU; and
transmitting the second workload pointer to a second GPU queue in the GPU,
wherein the GPU is configured to execute the first workload and the second workload in accordance with the universal processing context, and transition from executing the first workload to executing the second workload without executing a context switch.

2. The method of claim 1, wherein the universal processing context includes a pool of memory to be shared between the first application and the second application.

3. The method of claim 2, wherein an amount of memory allocated from the pool of memory to the first application is not equal to an amount of memory allocated from the pool of memory to the second application.

4. The method of claim 1, wherein the first workload comprises one or more cooperative thread arrays that are executed by a first set one or more processing cores of the GPU, and the second workload comprises one or more cooperative thread arrays that are executed by a second set one or more processing cores of the GPU.

5. The method of claim 1, wherein the first connection and the second connection are established via respective user mode drivers that are accessed by the first application and the second application.

6. The method of claim 1, wherein the first pointer is received from the first application and the second pointer is received from the second application.

7. The method of claim 1, further comprising:
establishing a third connection to a third compute application;
transmitting a third workload pointer to a third queue allocated to the third application, wherein the third workload pointer points to a third workload generated by the third application; and
transmitting the third workload pointer to a third GPU queue in the GPU, wherein the GPU is configured to suspend execution of both the first workload and the second workload and to execute the third workload without executing an additional context switch.

8. The method of claim 7, wherein the GPU is configured to execute the third workload according to the universal processing context.

9. The method of claim 1, wherein the transitioning execution from the first workload associated with the first application to the second workload associated with the second application is performed based on the universal processing context.

10. A non-transitory computer-readable storage medium storing instructions associated with a device driver that, when executed by a processor, cause the processor to perform the steps of:
establishing a first connection to a first application and a second connection to a second application;
establishing a universal processing context that is shared by the first application and the second application;
transmitting a first workload pointer to a first queue allocated to the first application, wherein the first workload pointer points to a first workload generated by the first application;
transmitting a second workload pointer to a second queue allocated to the second application, wherein the second workload pointer points to a second workload generated by the second application;
transmitting the first workload pointer to a first GPU queue in a graphics processing unit (GPU); and
transmitting the second workload pointer to a second GPU queue in the GPU,
wherein the universal processing context is shared by the first workload and the second workload, and the GPU is configured to transition from executing the first workload to executing the second workload without executing a context switch.

11. The non-transitory computer-readable storage medium of claim 10, wherein the universal processing context includes a pool of memory to be shared between the first application and the second application.

12. The non-transitory computer-readable storage medium of claim 11, wherein an amount of memory allocated from the pool of memory to the first application is not equal to an amount of memory allocated from the pool of memory to the second application.

13. The non-transitory computer-readable storage medium of claim 10, wherein the first workload comprises one or more cooperative thread arrays that are executed by a first set one or more processing cores of the GPU, and the second workload comprises one or more cooperative thread arrays that are executed by a second set one or more processing cores of the GPU.

14. The non-transitory computer-readable storage medium of claim 10, wherein the first connection and the second connection are established via respective user mode drivers that are accessed by the first application and the second application.

15. The non-transitory computer-readable storage medium of claim 10, wherein the first pointer is received from the first application and the second pointer is received from the second application.

16. The non-transitory computer-readable storage medium of claim 10, further comprising:
establishing a third connection to a third compute application;
transmitting a third workload pointer to a third queue allocated to the third application, wherein the third workload pointer points to a third workload generated by the third application; and transmitting the third workload pointer to a third GPU queue in the GPU, wherein the GPU is configured to suspend execution of both the first workload and the second workload and to execute the third workload without executing an additional context switch.

17. The non-transitory computer-readable storage medium of claim 16, wherein the GPU is configured to execute the third workload according to the universal processing context.

* * * * *